US008729811B2

(12) United States Patent
Melanson

(10) Patent No.: US 8,729,811 B2
(45) Date of Patent: May 20, 2014

(54) DIMMING MULTIPLE LIGHTING DEVICES BY ALTERNATING ENERGY TRANSFER FROM A MAGNETIC STORAGE ELEMENT

(75) Inventor: John L. Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 784 days.

(21) Appl. No.: 12/894,440

(22) Filed: Sep. 30, 2010

(65) Prior Publication Data
US 2012/0025733 A1 Feb. 2, 2012

Related U.S. Application Data

(60) Provisional application No. 61/369,202, filed on Jul. 30, 2010.

(51) Int. Cl.
*H05B 37/02* (2006.01)
*H05B 37/00* (2006.01)

(52) U.S. Cl.
USPC .......................................... 315/219; 315/312

(58) Field of Classification Search
USPC ......... 315/224, 246, 244, 247, 291, 307, 308, 315/312, 219, 185 R
See application file for complete search history.

(56) References Cited

U.S. PATENT DOCUMENTS

| 6,016,038 | A | 1/2000 | Mueller et al. |
| 6,150,774 | A | 11/2000 | Mueller et al. |
| 6,211,626 | B1 | 4/2001 | Lys et al. |
| 6,369,525 | B1 | 4/2002 | Chang et al. |
| 6,441,558 | B1 | 8/2002 | Muthu et al. |
| 6,495,964 | B1 | 12/2002 | Muthu et al. |
| 6,583,550 | B2 | 6/2003 | Iwasa et al. |
| 6,636,003 | B2 | 10/2003 | Rahm et al. |
| 6,688,753 | B2 | 2/2004 | Calon et al. |
| 6,753,661 | B2 | 6/2004 | Muthu et al. |
| 6,756,772 | B2 | 6/2004 | McGinnis |
| 6,788,011 | B2 | 9/2004 | Mueller et al. |

(Continued)

FOREIGN PATENT DOCUMENTS

| EP | 1528785 | 4/2005 |
| EP | 1842399 | 10/2007 |

(Continued)

OTHER PUBLICATIONS

Dyble, et al, Impact of Dimming White LEDS: Chromaticity Shifts in High-Power White LED Systems Due to Different Dimming Methods, International Society of OpticalEngineers, 2005, Fifth International Conference on Solid State Lighting, Proceedings of SPIE 5941: 291-299, Troy, NY, USA.

(Continued)

*Primary Examiner* — Minh D A
(74) *Attorney, Agent, or Firm* — Mitch Harris, Atty at Law, LLC; Andrew M. Harris

(57) ABSTRACT

A single magnetic storage element is used to provide power to multiple lighting devices, which may be strings of light-emitting diodes (LEDs) of different color. A switching circuit controls alternating application of energy among the multiple lighting devices and another switching circuit may charge the primary winding to different energy levels to control the intensity of the multiple lighting devices. In particular, the multiple lighting devices may be controlled to provide a desired color profile while dimming the lighting devices, while requiring only a single magnetic storage element for supplying energy to the lighting devices.

29 Claims, 10 Drawing Sheets

(56) References Cited

U.S. PATENT DOCUMENTS

| | | | |
|---|---|---|---|
| 6,888,322 B2 | 5/2005 | Dowling et al. | |
| 6,958,920 B2 | 10/2005 | Mednik et al. | |
| 6,967,448 B2 | 11/2005 | Morgan et al. | |
| 6,975,079 B2 | 12/2005 | Lys et al. | |
| 7,064,498 B2 | 6/2006 | Dowling et al. | |
| 7,088,059 B2 | 8/2006 | McKinney et al. | |
| 7,135,824 B2 | 11/2006 | Lys et al. | |
| 7,246,919 B2 | 7/2007 | Porchia et al. | |
| 7,255,457 B2 | 8/2007 | Ducharme et al. | |
| 7,288,902 B1 | 10/2007 | Melanson | |
| 7,310,249 B2* | 12/2007 | Yasumura | 363/24 |
| 7,375,476 B2 | 5/2008 | Walter et al. | |
| 7,511,437 B2 | 3/2009 | Lys et al. | |
| 2002/0117972 A1* | 8/2002 | Ito et al. | 315/219 |
| 2002/0145041 A1 | 10/2002 | Muthu et al. | |
| 2002/0191418 A1* | 12/2002 | Clayton et al. | 363/17 |
| 2004/0085030 A1 | 5/2004 | Laflamme et al. | |
| 2004/0169477 A1 | 9/2004 | Yanai et al. | |
| 2004/0212321 A1 | 10/2004 | Lys et al. | |
| 2005/0218838 A1 | 10/2005 | Lys | |
| 2005/0253533 A1 | 11/2005 | Lys et al. | |
| 2006/0023002 A1 | 2/2006 | Hara et al. | |
| 2006/0125420 A1 | 6/2006 | Boone et al. | |
| 2006/0226795 A1 | 10/2006 | Walter et al. | |
| 2007/0024213 A1 | 2/2007 | Shteynberg et al. | |
| 2007/0029946 A1 | 2/2007 | Yu et al. | |
| 2007/0030241 A1* | 2/2007 | Adachi et al. | 345/102 |
| 2007/0114952 A1* | 5/2007 | Yang | 315/307 |
| 2007/0126656 A1 | 6/2007 | Huang et al. | |
| 2007/0170876 A1* | 7/2007 | Ito et al. | 315/312 |
| 2008/0012502 A1 | 1/2008 | Lys | |
| 2008/0018261 A1 | 1/2008 | Kastner | |
| 2008/0054815 A1 | 3/2008 | Kotikalapoodi et al. | |
| 2008/0116818 A1 | 5/2008 | Shteynbert et al. | |
| 2008/0224635 A1 | 9/2008 | Hayes | |
| 2008/0232141 A1* | 9/2008 | Artusi et al. | 363/21.01 |
| 2009/0218960 A1 | 9/2009 | Lyons et al. | |
| 2010/0164403 A1* | 7/2010 | Liu | 315/297 |
| 2010/0283322 A1 | 11/2010 | Wibben | |
| 2010/0295472 A1 | 11/2010 | Wibben et al. | |
| 2012/0025722 A1 | 2/2012 | Mokry et al. | |

FOREIGN PATENT DOCUMENTS

| | | |
|---|---|---|
| EP | 2161969 A2 | 3/2010 |
| WO | 02091805 A2 | 11/2002 |
| WO | 2006067521 | 6/2006 |
| WO | 2007026170 A2 | 3/2007 |
| WO | 2011061505 | 5/2011 |

OTHER PUBLICATIONS

Color Temperature, www.sizes.com/units/color_temperature.htm, printed Mar. 27, 2007.

Linear Technology, Triple Output LED Driver, Datasheet LT3496, Linear Technology Corporation, LT 0510 Rev F, 2007, Milpitas, CA, USA.

Dilouie, Craig, Introducing the LED Driver, Electrical Construction & Maintenance (EC&M), Sep. 1, 2004, pp. 28-32, Zing Communications, Inc., Calgary, Alberda, Canada.

Wikipedia, Light-Emitting Diode, http://en.wikipedia.org/wiki/Light-emitting_diode, printed Mar. 27, 2007.

Linear Technology, News Release, Triple Output LED Driver Drives Up to 24×500mA Leds & Offers 3,000:1 True Color PWM Dimming, Mar. 24, 2007, Milpitas, CA, USA.

Ohno, Yoshi, Spectral Design Considerations for White LED Color Rendering, Optical Engineering, vol. 44, Issue 11, Special Section on Solid State Lighting, Nov. 30, 2005, Gaithersburg, MD, USA.

Dyble, et al, Impact of Dimming White LEDS: Chromaticity Shifts in High-Power White LED Systems Due to Different Dimming Methods, International Society of Optical Engineers, Sep. 2005, Fifth International Conference on Solid State Lighting, Proceedings of SPIE 5941: 291-299, Troy, NY, USA.

* cited by examiner

DIMMING MULTIPLE LIGHTING DEVICES BY ALTERNATING ENERGY TRANSFER FROM A MAGNETIC STORAGE ELEMENT

The present U.S. patent application claims priority under 35 U.S.C. §119(e) to U.S. Provisional Patent Application Ser. No. 61/369,202 filed on Jul. 30, 2010.

BACKGROUND OF THE INVENTION

1. Field of the Invention

The present invention relates generally to lighting device power sources such as those included within dimmable light emitting diode lamps, and in particular to a lighting device power source that supplies and dims multiple lighting devices from a single transformer.

2. Background of the Invention

Lighting control and power supply integrated circuits (ICs) are in common use in both electronic systems and in replaceable consumer lighting devices, e.g., light-emitting-diode (LED) and compact fluorescent lamp (CFL) replacements for traditional incandescent light bulbs.

In particular, in dimmable replacement light bulbs, matching the hue/intensity profile of a traditional incandescent bulb as the lighting is typically not performed. Separate LED strings of different colors are needed in order to change the hue of the light, which raises cost. Further, each LED string typically requires a separate controllable power supply, adding additional cost, in particular when isolation is required.

Therefore, it would be desirable to provide a lower-cost power source circuit that can supply multiple strings of LEDs without requiring separate power supplies. It would further be desirable to provide an isolated power source circuit that can supply multiple strings of LEDs.

SUMMARY OF THE INVENTION

The invention is embodied in a circuit for supplying power to multiple lighting devices, an IC including such a circuit and a method of operation of the circuit.

The circuit uses a single magnetic storage element that is charged during charging intervals and discharged during flyback intervals. The flyback interval energy transfer is applied in an alternating fashion to the multiple lighting devices, which may be strings of series-connected LEDs of different color. The alternating energy transfer may be performed by a switching circuit that alternatively switches the magnetic storage element to the multiple lighting devices, or the alternating may be performed in part by using the total forward bias voltage of LED strings that are connected in parallel and providing a switching device that disables an LED string having a lower total forward bias voltage, thereby permitting another LED string to conduct.

The circuit may be an isolated circuit employing a transformer as the magnetic storage element and synchronization of the secondary-side switching circuit and a primary-side switch that controls the charging of the transformer can be accomplished by a separate isolated control path, a transmission through the transformer from primary to secondary, for example by a modulated power signal or information transmitted during a non-power interval. Alternatively, a primary-side controller may detect conditions such as a change in secondary winding voltage or flyback interval duration due to different LED string total forward bias voltages and use the detected information to synchronize the primary-side switch.

The foregoing and other objectives, features, and advantages of the invention will be apparent from the following, more particular, description of the preferred embodiment of the invention, as illustrated in the accompanying drawings.

DESCRIPTION OF ILLUSTRATIVE EMBODIMENT

The present invention encompasses circuits and methods for powering and controlling lighting devices. In particular embodiments, strings of light-emitting diodes (LEDs) are packaged to replace incandescent lamps, and the relative energy supplied to strings of different colors is varied as dimming is applied to the LED strings, so that a desired spectrum vs. intensity profile is achieved. The present invention powers multiple lighting devices using a single magnetic storage device such as a transformer or inductor, and alternately charges the magnetic storage device with energy to be supplied to corresponding ones of the lighting devices, which reduces cost and complexity of the power supply over a circuit in which separate magnetics are provided for each lighting device that is controlled.

Figure 1:
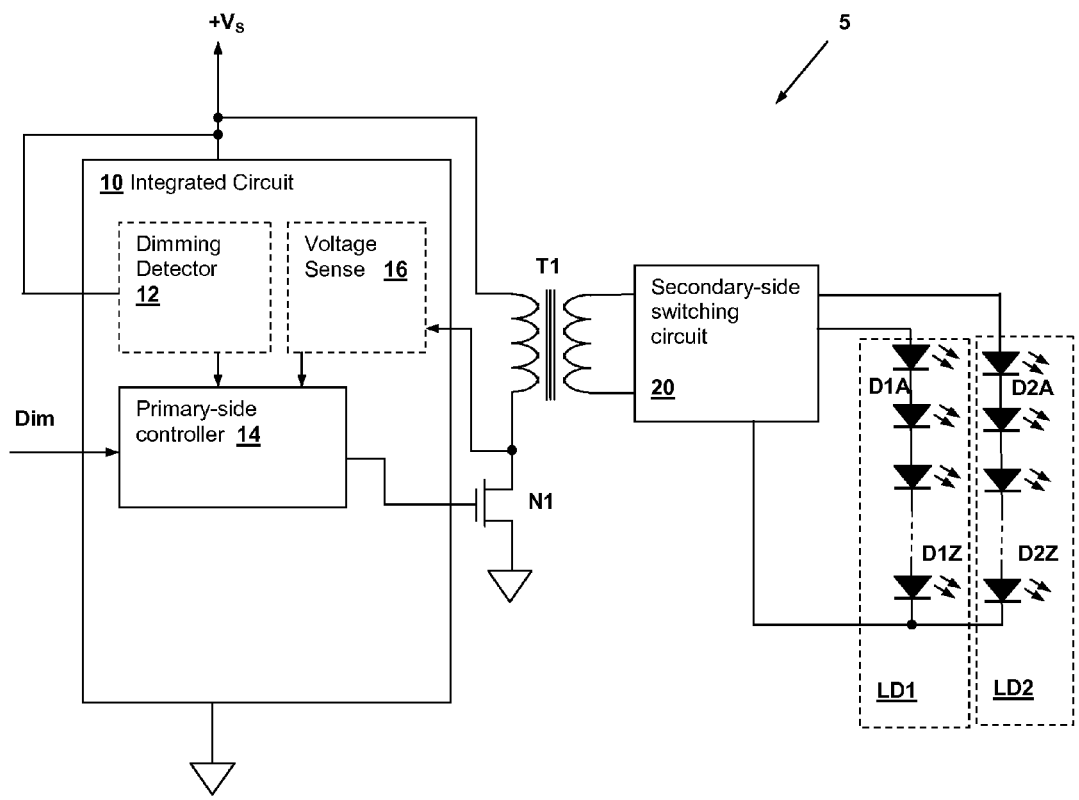
FIG. 1 is a block diagram depicting a lighting circuit in accordance with an embodiment of the present invention.

Referring now to FIG. 1, a lighting circuit 5 in accordance with an embodiment of the invention is shown. A transformer T1, provides a magnetic storage element through which energy is alternatively supplied to a first lighting device LD1 and a second lighting device LD2, respectively. Transformer T1 further provides isolation between a primary side circuit coupled to a rectified line voltage source $+V_S$ and the lighting devices, which in the depicted embodiment are strings of series connected light-emitting diodes (LEDs) D1A-D1Z in lighting device LD1 and LEDs D2A-D2Z in lighting device LD2. While the exemplary lighting devices are LEDs in the Figure, lighting devices LD1 and LD2 can alternatively be another type of lighting device, in accordance with other embodiments of the invention.

An integrated circuit (IC) 10 provides a primary-side controller 14 that operates a switching transistor N1, which is illustrated as external to IC 10, but that alternatively may be included within IC 10. Primary-side controller 14 may be a pulse-width modulator, or other suitable controller capable of controlling the amount of energy applied to the primary winding of transformer T1, by the activation of switching transistor N1, according to dimming values DIM, which may be provided by a source internal or external to integrated circuit 10, and that may be optionally determined by a dimming detection circuit 12 that detects a dimming level of a dimmer controlling the line voltage from which power supply voltage +$V_S$ is derived. Lighting circuit 5 of FIG. 1 also includes a secondary-side switching circuit 20 that controls the alternating application of energy that was stored in transformer T1 during charging intervals when primary-side controller 14 activates switching transistor N1. Secondary-side switching circuit alternatively selects application of output current or voltage between lighting devices LD1 and LD2 during corresponding flyback intervals.

By controlling a level of energy storage in transformer T1 during the different charging intervals corresponding to lighting devices LD1 and LD2, the level of illumination intensity provided by lighting devices LD1 and LD2 can be controlled according to dimming values DIM. By using lighting devices LD1 and LD2 of different colors, a dimming profile matching that of an incandescent lamp can be obtained. In order to provide the proper energy levels in the proper cycles, synchronization must be maintained between primary-side controller 14 and secondary-side switching circuit 20. As will be illustrated below in accordance with various embodiments of the invention, the master synchronization source may be either primary-side controller 14 or secondary-side switching circuit 20 and synchronization information may be transmitted/received through transformer T1, or through another isolated or non-isolated connection. In accordance with certain embodiments of the invention, a voltage sensing circuit 16 within integrated circuit 10 may detect conditions at the secondary winding of transformer T1 that indicate the cycle state of secondary-side switching circuit, eliminating the need for any extra components to provide the synchronization.

Figure 2A:
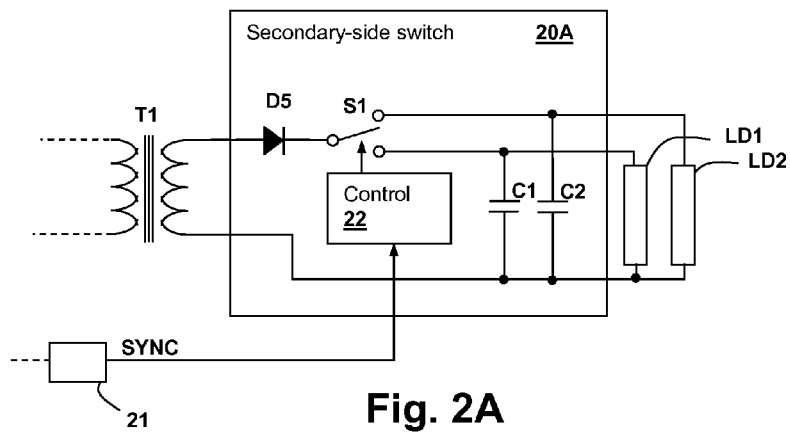
FIGS. 2A-2D are simplified schematic diagrams of lighting circuits that can be used in the lighting circuit of FIG. 1 in accordance with alternative embodiments of the present invention.

Referring now to FIG. 2A, a portion of a lighting circuit that can be used to implement lighting circuit 5 of FIG. 1 is illustrated. In the depicted embodiment, a secondary-side switch circuit 20A, includes a blocking diode D5 that prevents discharge of either of capacitors C1 and C2, that are connected in parallel with corresponding lighting devices LD1 and LD2, respectively. A switch S1 alternately selects application of current or voltage to lighting devices LD1 and LD2 from the secondary winding of transformer T1, according to a control signal provided by a control circuit 22. Control circuit 22 receives a synchronization signal SYNC, from an isolated coupling device such as an optocoupler 21 or another circuit such as a signal transformer.

Figure 6A:
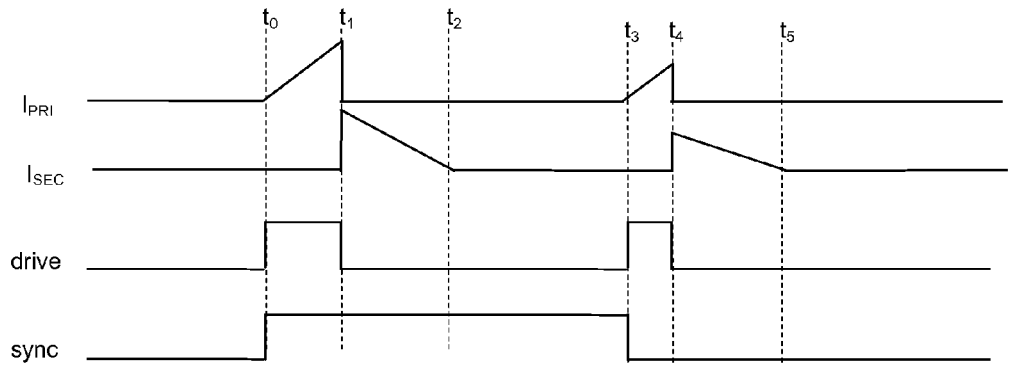
FIGS. 6A-6E are timing diagrams illustrating signals within different lighting circuits in accordance with various embodiments of the present invention.

Referring now to FIG. 6A, exemplary signals within the circuit of FIG. 2A are illustrated. A first charging interval between times $t_0$ and $t_1$ stores energy in transformer T1 determined by the peak of primary winding current $I_L$ at time $t_1$. The rising value of primary winding current $I_{PRI}$ is caused by activation of switching transistor N1 according to gate drive signal drive. During a first flyback interval between times $t_1$ and $t_2$, since synchronization signal sync is active, switch S1 applies the flyback secondary current $I_{SEC}$ from the secondary winding of transformer T1 to capacitor C1, to power lighting device LD1. During a second charging interval between times $t_3$ and $t_4$ energy is stored in transformer T1 as determined by the peak of primary winding current $I_L$ at time $t_4$. During a second flyback interval between times $t_4$ and $t_5$, since synchronization signal sync is inactive, switch S1 applies the flyback current $I_{SEC}$ from secondary winding of transformer T1 to capacitor C2, to power lighting device LD2. The waveforms illustrated in FIG. 6A are repeated to continuously and alternatively charge capacitors C1 and C2 to provide energy to lighting devices LD1 and LD2. By controlling the value of primary winding current $I_{PRI}$ at times $t_1$ and $t_4$, the intensities of lighting devices LD1 and LD2, respectively, are controlled. Thus, controlling the time period between times $t_1$ and $t_2$, controls the intensity of lighting device LD1 and controlling the time period between times $t_3$ and $t_4$, controls the intensity of lighting device LD2. The timing of synchronization signal sync as shown in FIG. 6A is only illustrative, and the occurrence of synchronization signal sync can be at any time exclusive of the time periods between times $t_1$ and $t_2$ and between times $t_3$ and $t_4$, so that the position of switch S1 is not changed during the flyback intervals.

Figure 6B:
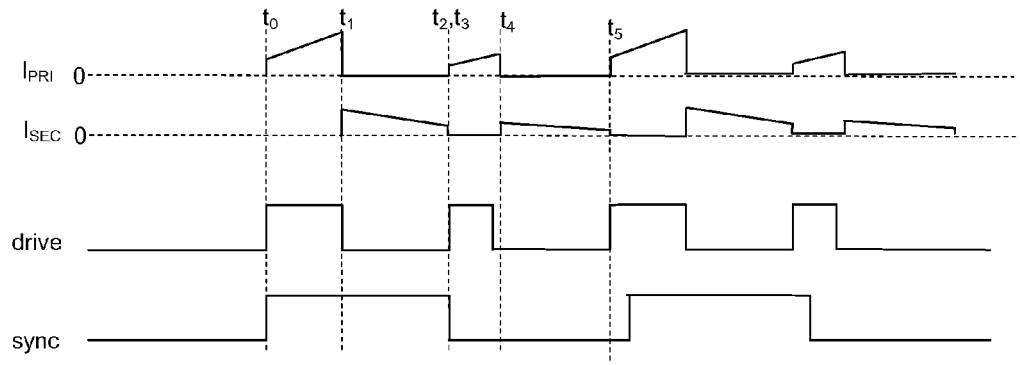

While FIG. 6A illustrates operation of lighting circuit 5 in discontinuous conduction mode (DCM), in which the current through the primary winding of transformer T1 always returns to a zero state, operation of lighting circuit 5 in continuous conduction mode (CCM) is also possible. FIG. 6B illustrates CCM operation in which residual energy is stored in the magnetic storage element is never completely discharged and thus times $t_2$ and $t_3$ from FIG. 6A coincide.

Figure 2B:
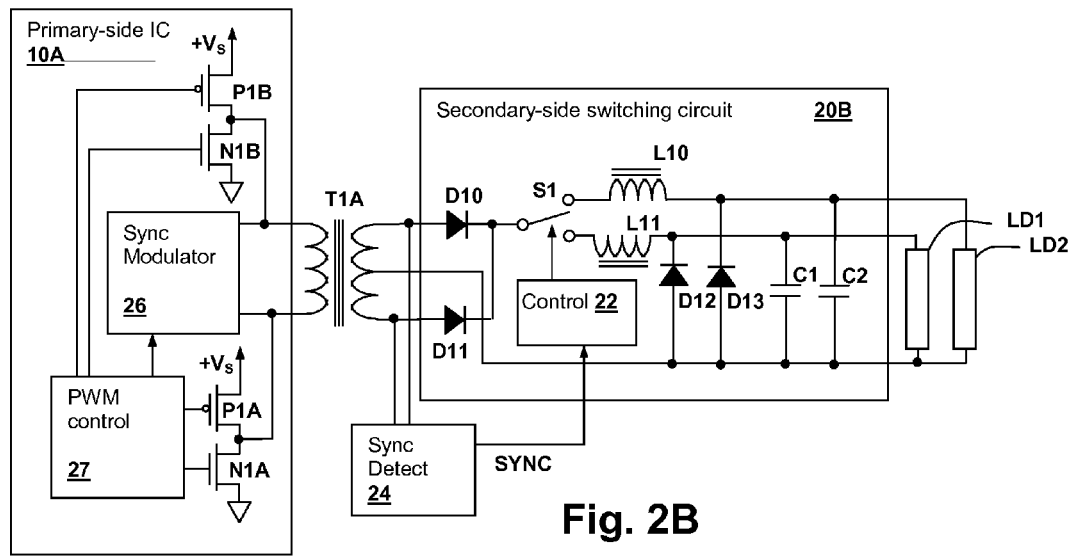

Referring now to FIG. 2B, variations on the circuit of FIG. 2A are illustrated, which may be applied in whole or in part to the circuit of FIG. 1. The circuit of FIG. 2B illustrates the application of techniques of the present invention in a forward converter topology with a tapped secondary winding. Since the operation and structure of the circuit of FIG. 2B are similar to the circuit of FIG. 2A, only differences between them will be described below. In the circuit of FIG. 2B, synchronization information is provided through transformer T1A from a sync modulator 26 coupled to the primary winding of transformer T1A. Modulation of synchronization information may be alternatively performed by the control of primary-side switching transistors N1A, N1B, P1A, P1B, which form a full-bridge switching circuit controlled by a pulse width modulation (PWM) control circuit 27.

Figure 6C:
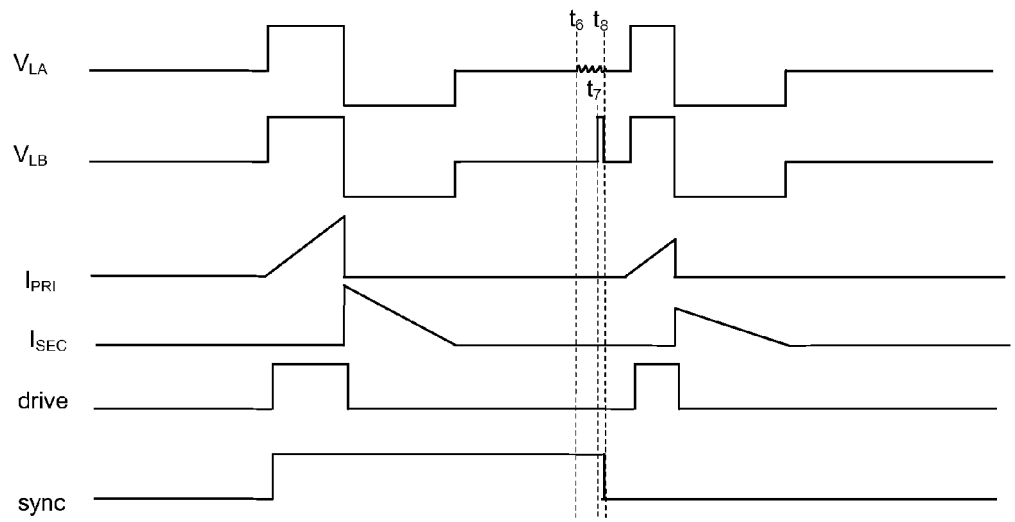

The modulated synchronization information is detected at the secondary winding of transformer T1A by a sync detect circuit 24, which constructs synchronization signal SYNC from the modulated synchronization information. Secondary-side control circuit 22 receives the SYNC signal and controls switch S1 accordingly. FIG. 2B also illustrates the use of a split-secondary transformer T1A, using a full bridge rectifier formed by diodes D10-D13 to charge capacitors C1 and C2 through filter inductors L10 and L11, respectively. Exemplary modulated synchronization information waveforms are illustrated in FIG. 6C. Exemplary primary winding voltage waveform $V_{LA}$ includes a modulated high frequency burst at time $t_6$ that may be superimposed on the primary winding of transformer T1A by sync modulator 26 and detected by sync detect circuit 24. Synchronization signal sync is de-asserted at time $t_8$ after the burst is detected. Alternatively, exemplary primary winding voltage waveform $V_{LB}$ includes a narrow pulse at time $t_7$ that may be superimposed on the primary winding of transformer T1A by sync modulator 26 or by switching transistor N1 and detected by sync detect circuit 24. Synchronization signal sync is de-asserted at time $t_8$ after the narrow pulse is detected.

Figure 2C:
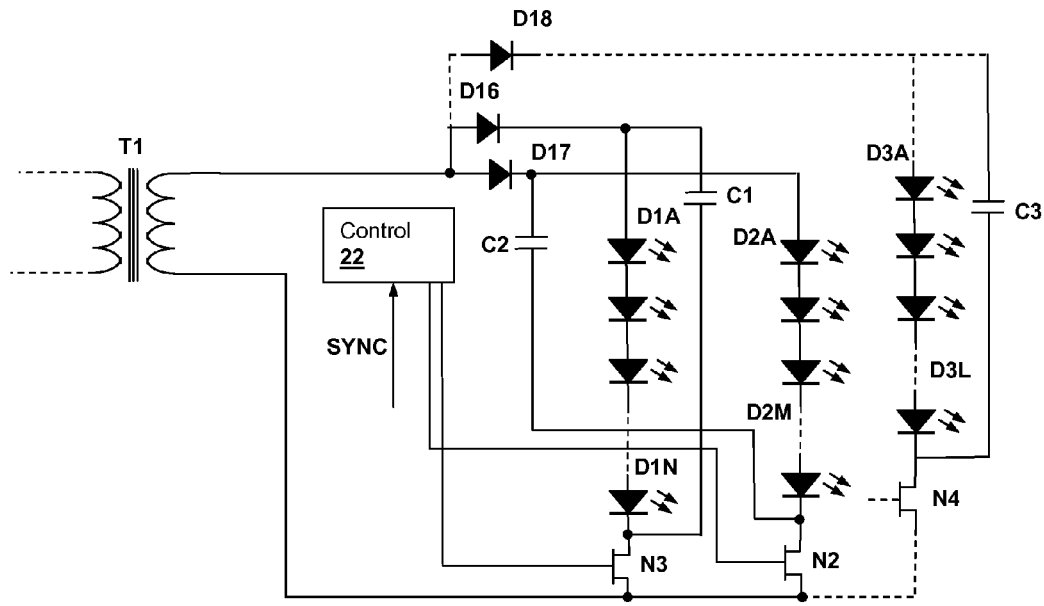

Referring now to FIG. 2C, variations on the circuits of FIG. 2A and FIG. 2B are illustrated, which may be applied in whole or in part to lighting circuit 5 of FIG. 1, as well as other circuits illustrated herein. Since the operation and structure of the circuit of FIG. 2C are similar to the circuits of FIG. 2A and FIG. 2B, only differences between them will be described below. In the circuit of FIG. 2C, switch S1 is implemented by transistors N2 and N3, in the return paths of the LED strings formed by LEDs D1A-D1N and D2A-D2M, which simplifies the control requirements of control circuit 22 by reducing the voltage handling required of the switching circuit. Also illustrated is an optional third LED string formed by LEDs D3A-D3L with holding capacitor C3 and controlled by a transistor N4, showing that the alternating action of the present invention is not limited to alternating between supplying energy two lighting devices, but that larger numbers of lighting devices may be supplied. Diodes D16-D18 provide isolation between LED strings and prevention of backflow of current through transformer T1.

Figure 6D:
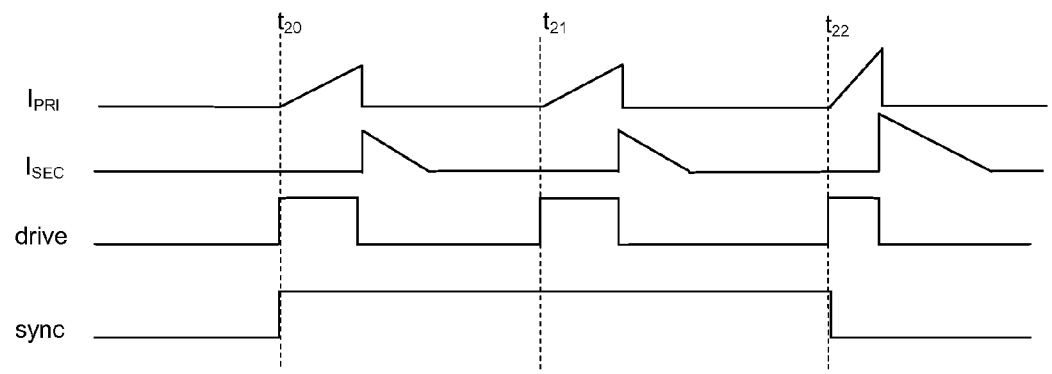

Referring now to FIG. 6D, alternation between supplying energy to three lighting devices is shown. During a charging interval between times $t_{10}$ and $t_{11}$ and a flyback interval between times $t_{11}$ and $t_{12}$, energy is transferred to capacitor C1 to supply the LED string formed by LEDs D1A-D1N. Similarly, during a charging interval between times $t_{13}$ and $t_{14}$ and a flyback interval between times $t_{14}$ and $t_{15}$, energy is transferred to capacitor C2 to supply the LED string formed by LEDs D2A-D2M. Finally, during a charging interval between times $t_{15}$ and $t_{16}$ and a flyback interval between times $t_{17}$ and $t_{18}$, energy is transferred to capacitor C1 to supply the LED string formed by LEDs D3A-D3L. As illustrated signal sync in FIG. 6D is only asserted to indicate the first (or optionally the last) power transfer cycle, i.e., a pair of charging and flyback intervals, in the rotation. While the illustrated waveforms provide a relationship of one charging interval to one flyback interval, it is understood to be within the scope of the present invention to combine charging intervals such that flyback current is split between multiple lighting devices so that the flyback intervals alternate but the charging intervals are combined. In such a scheme, synchronization signal sync can be asserted to indicate the beginning of the flyback interval and de-asserted to indicate the change of state needed at the secondary-side switching circuit.

Figure 6E:
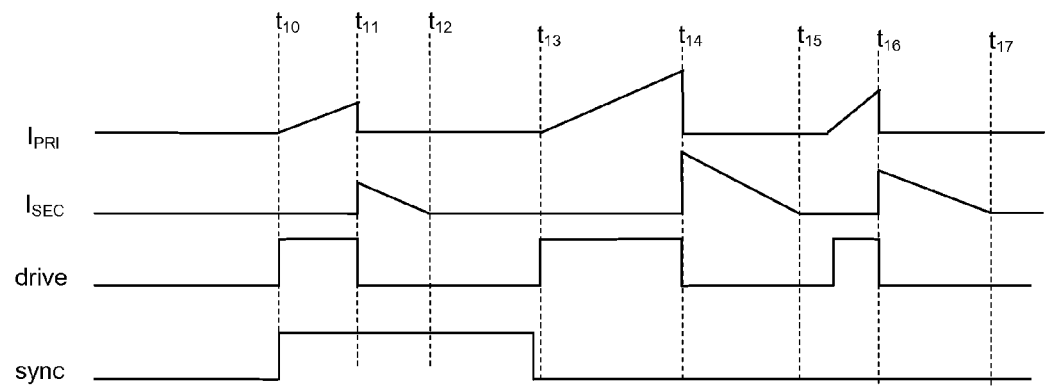

Also within the scope of the alternating operation of the present invention is a scheme in which multiple charging and flyback intervals corresponding to one lighting device are included between another interval corresponding to another lighting device. Referring now to FIG. 6E, a power transfer cycle commencing at time $t_{20}$ and another commencing at time $t_{21}$ are applied to the same lighting device, e.g., lighting device LD1 in FIG. 1, and a third power transfer cycle commencing at time $t_{22}$ is applied to a second lighting device, e.g., lighting device LD2 of FIG. 1. Such a scheme is particularly appropriate in some LED color arrangements in which particular color LEDs require more current than others to produce an appropriate level of intensity.

Figure 2D:
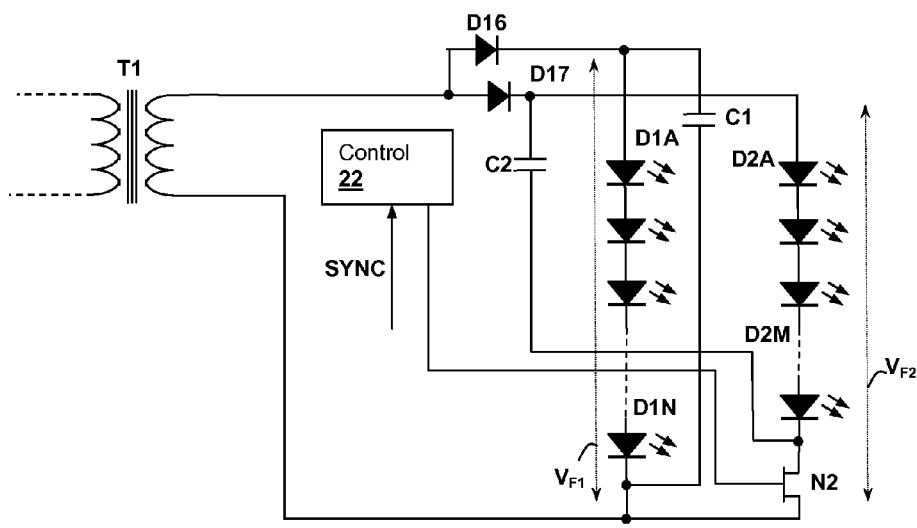
Figure 7A:
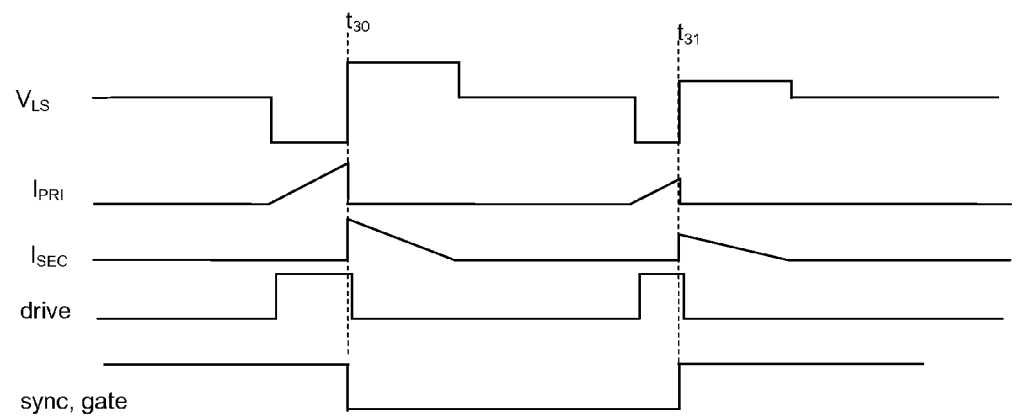
FIGS. 7A-7D are timing diagrams illustrating signals within lighting circuits in accordance with other embodiments of the present invention.

Referring now to FIG. 2D, a lighting circuit in accordance with another embodiment of the present invention is shown. Since the operation and structure of the circuit of FIG. 2D are similar to the circuits of FIG. 2A-2C as described above, only differences between them will be described below. FIG. 2D illustrates a simplified circuit and technique for alternatively activating charging of two or more LED strings. Rather than provide a transistor or other switch for each of the LED strings, the LED strings can be made to have different total forward voltages when forward-biased. In fact, LED strings will generally differ in total forward voltage, since LEDs of different color typically have different forward voltages, Further, the different intensities required for the different colors and/or due to differences between LED outputs for different color LEDs will generally dictate a different number of LEDs for the different strings. The difference in total forward voltage for the LED strings can be used to advantage. Since the LED strings are connected in parallel, only the LED string having the lowest total forward voltage will be energized and LED string(s) having a higher total forward voltage will not conduct due to the clamping action of the LED string having the lowest total forward voltage. By adding a transistor N2 to the LED string formed by LEDs D2A-D2M having the lowest total forward voltage $V_{F2}$, that LED string can be disabled, causing the LED string formed by LEDs D1A-D2N to be energized. By enabling transistor N2 during every other flyback period, alternation between two LED strings is accomplished. FIG. 7A shows waveform $V_{LS}$, which is indicative of the voltage across the secondary winding of transformer T1. At time $t_{30}$ the voltage across the secondary winding has a higher magnitude than the voltage at time $t_{31}$, due to a higher value of total forward voltage $V_{F1}$. Transistor N2 is operated by gate signal gate, which is activated at time $t_{31}$, causing a lower voltage to appear across the secondary winding of transformer T1. The technique illustrated in FIG. 2D can be applied to lighting circuits having more than two LED strings, by providing a control transistor for each LED string other than the one having the highest total forward voltage.

Figure 3A:
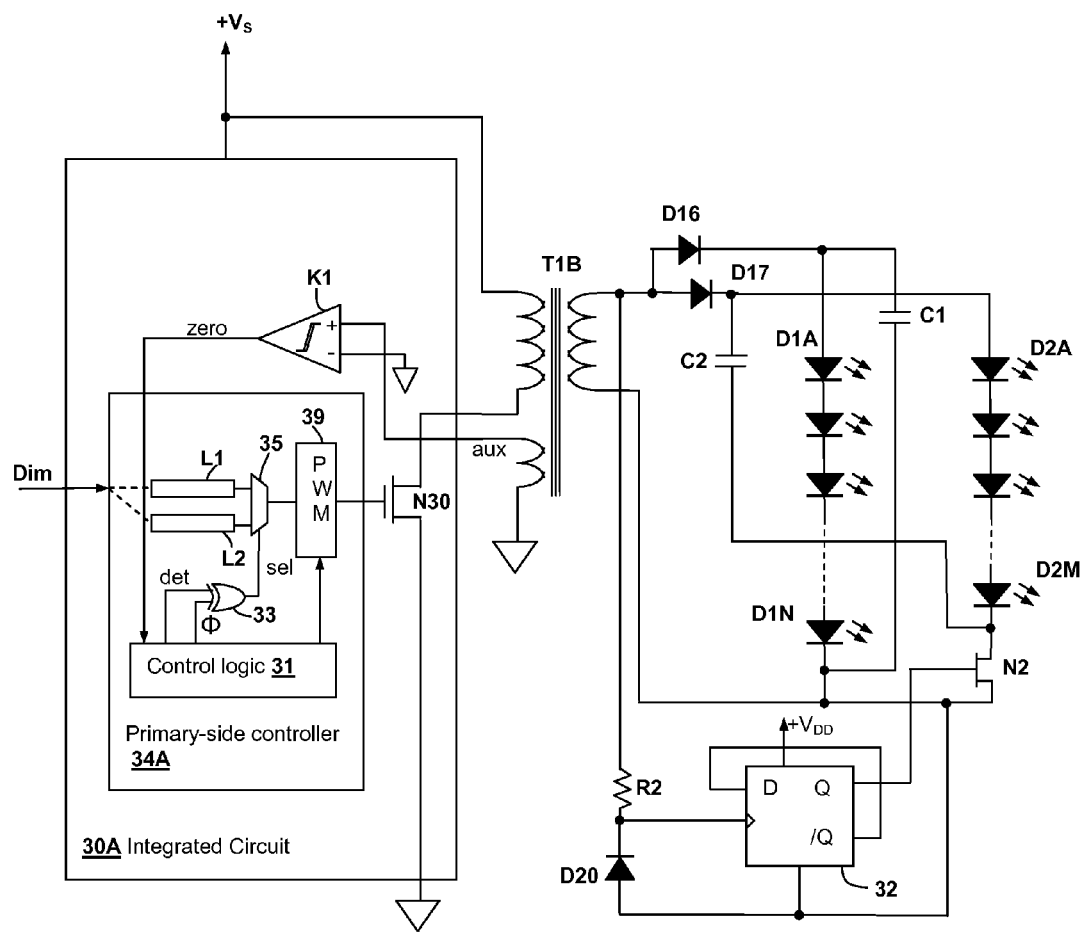
FIG. 3A is a simplified schematic diagram of a lighting circuit in accordance with another embodiment of the present invention.

Referring now to FIG. 3A, a lighting circuit in accordance with another embodiment of the present invention is shown. IC 30A includes a primary-side controller 34A that operates a switching transistor N30 to switch current through the primary winding of a transformer T1B from rectified line supply $+V_S$. Primary-side controller 34A includes a pulse-width modulator (PWM) 39 for controlling on-times of switching transistor N30, according to dimming values stored in latches L1 and L2. A multiplexer 35 selects between the dimming values stored in latches L1 and L2 according to the state of select signal sel.

Transformer T1B includes an auxiliary winding aux that provides a feedback signal that indicates when secondary current $I_{SEC}$ of transformer T1B has stopped flowing due to the previously-conducting one of diodes D16 or D17 becoming reverse biased. A hysteresis comparator K1 generates a zero indication signal zero when the voltage across auxiliary winding aux has reached a value substantially equal to zero. Zero indication signal zero is provided to control logic 31, which uses the information provided by signal zero to control operation of PWM 39 and in particular to control the state of a selection signal sel that alternates according to which lighting devices are being powered in a given cycle. Selection signal sel provides information to synchronize the primary-side circuits and secondary-side circuits coupled to transformer T1B, while maintaining isolation and without requiring transmission of extra information or additional isolators such as optocouplers. Select signal sel is generated in accordance with a divided clock signal Φ generated by control logic 31. Divided clock signal Φ is selectively inverted to generate select signal sel by logical exclusive-OR gate 33, under control of control signal st, which is determined from processing circuits within control logic 31 as described in further detail below. Control signal st provides an indication of the phase relationship between the divided clock signal Φ and the phase of the output of a flip-flip 32 that alternatively enables transistor N2 in the circuit coupled to the secondary of transformer T1B.

The secondary-side circuit depicted in FIG. 3A is similar to the circuit depicted in FIG. 2D as described above, except that flip-flop 32 changes states every time the voltage across the secondary winding of transformer T1B rises above a threshold, i.e., at the beginning of every flyback interval. A resistor R2 couples the clock input of flip-flop 32 to the secondary winding of transformer T1B and a diode D20 prevents the clock input of flip-flop 32 from being pulled to a negative voltage that could damage flip-flop 32 after the flyback interval ends. The inverting output of flip-flop 32 is coupled to the input of flip-flop 32 so that at every cycle, the output of flip-flop 32 will alternate in state. Therefore, transistor N2 will be enabled every other cycle, so that the LED strings formed by diodes D1A-D1N and diodes D2A-D2M, and their corresponding holding capacitors C1 and C2, respectively, are alternatively charged as described above with respect to FIG. 2D. However, the initial state of flip-flop 32 may not initially be synchronized with the state divided clock signal Φ.

Figure 7B:
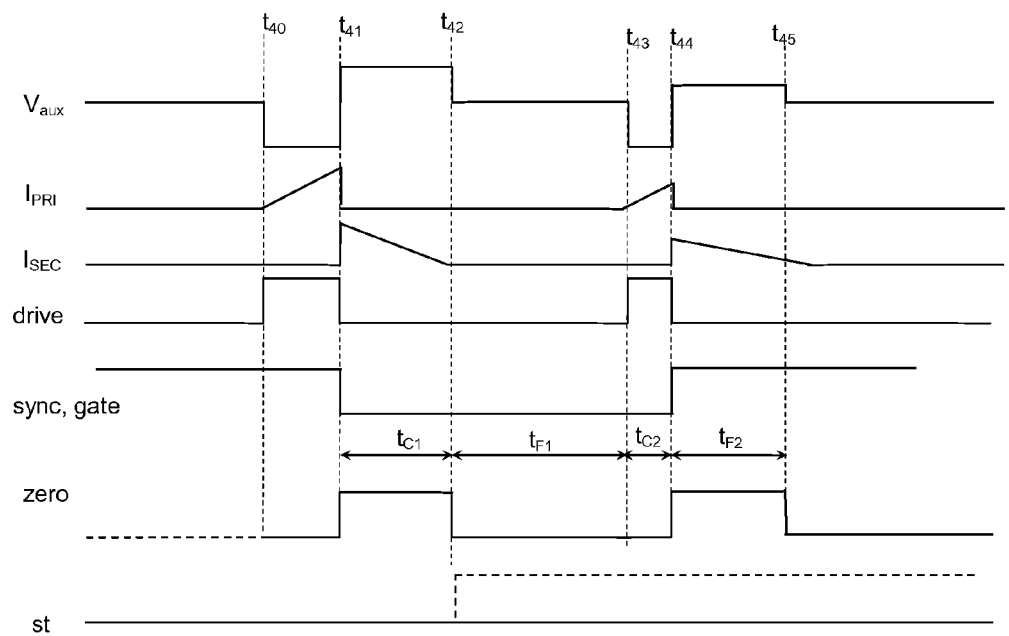

Returning again to the internal details of IC 30A, information about the state of flip-flop 32 that determines which of diodes D16 or D17 in the secondary-side circuit conducts in a given flyback period, can be obtained from auxiliary winding aux. Since the voltage across the secondary winding will be different when energizing the LED string formed by diodes D1A-D1N versus the LED string formed by diodes D2A-D2M, the times at which the corresponding flyback intervals end will differ between the alternating cycles. The waveforms depicted in FIG. 7B are indicative of signals within the circuit of FIG. 3A. Zero signal zero changes state at time $t_{42}$ after the secondary current $I_{SEC}$ of transformer T1B falls to zero, since voltage $V_{AUX}$ drops to zero at that time, triggering hysteresis comparator K1. Zero signal zero also changes state at the beginning of each flyback cycle and at time $t_{42}$ after secondary current $I_{SEC}$ again, so that zero signal zero provides pulses having a width substantially equal to the duration of the flyback intervals. Control logic 31 also receives gate signal gate, and thereby has information indicating the duration of both the charging intervals ($t_{C1}, t_{C2}$) and the flyback intervals ($t_{F1}, t_{F2}$). The charging and flyback interval times are related to the output voltage according to:

$$V_{OUT1}=N*V_S*T_{C1}/T_{F1} \text{ and } V_{OUT2}=N*V_S*T_{C2}/T_{F2},$$

where $V_{OUT1}$ and $V_{OUT2}$ are the secondary voltages during flyback intervals $T_{F1}$ and $T_{F2}$, respectively and N is the ratio of the secondary winding turns to the primary winding turns. Since the supply voltage $V_S$ can be assumed constant and the turns ratio N is constant, the ratio $V_{OUT1}/V_{OUT2}=(T_{C1}*T_{F2})/(T_{F1}*T_{C2})$ can be computed and if greater than unity, indicates that the first flyback interval is charging the LED string formed by diodes D1A-D1N and if less than unity, the first flyback interval is charging the LED string formed by diodes, permitting control circuit 31 to determine the correct synchronization state of flip-flop 32 without a direct feedback signal. If the computed value is not the expected value, control logic 31 changes the state of control signal st to invert selection signal sel to properly synchronize the operation of selector 35, which, if needed, is shown as occurring at time $t_{42}$.

Figure 3B:
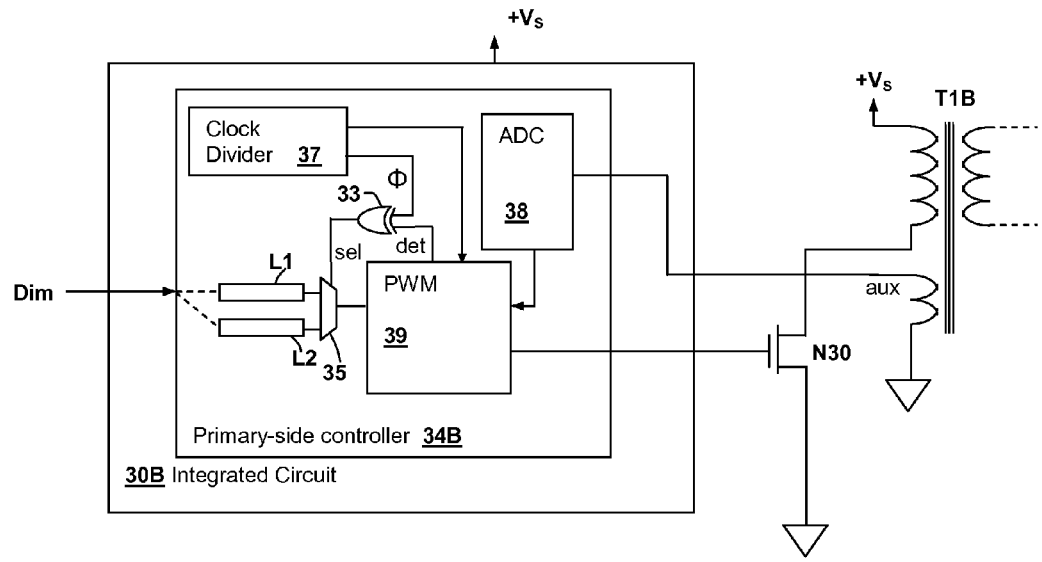
FIG. 3B illustrates an alternative primary-side integrated circuit 30B in accordance with an alternative embodiment of the invention.

Referring now to FIG. 3B, an alternative embodiment of primary-side IC 30B that may be used in place of integrated circuit 30A in FIG. 3A, is shown. IC 30B includes a primary-side controller 34B that operates switching transistor N30 to switch current through the primary winding of transformer T1B from rectified line supply $+V_S$. Primary-side controller 34B also includes an analog-to-digital converter (ADC) coupled to auxiliary winding signal aux of transformer T1B, that, among performing other feedback functions, provides an indication of the voltage across the secondary winding during the flyback intervals, which as described above, gives an indication of the state of flip-flop 32. In an alternative embodiment, either ADC 38 or another voltage sensing circuit such as a comparator circuit may be coupled to the primary winding of transformer T1B, to provide an indication of the voltage across the secondary winding of transformer T1B during the flyback intervals. Other operation and structure of IC 30B is similar to the operation and structure of IC 30A of FIG. 3A. Therefore, only other differences in their operation and structure will be illustrated below.

Figure 7C:
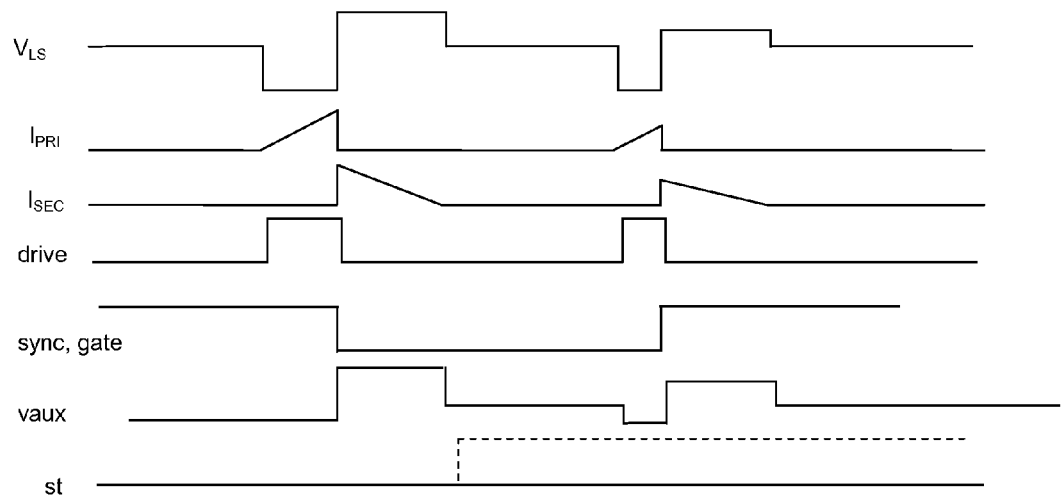

Logical exclusive-OR gate 33 is controlled by a control signal det, which is provided from PWM controller 39, which derives the proper state of control signal det by comparing the voltages sampled by ADC 38 during the alternating flyback intervals. Since the voltage across the secondary winding of transformer T1B will be different when energizing the LED string formed by diodes D1A-D1N versus the LED string formed by diodes D2A-D2M, the voltage sampled by ADC 38 during the flyback intervals switch S30 will differ between the alternating cycles. The waveforms depicted in FIG. 7C are indicative of signals within the circuit of FIG. 3B and waveforms of signal vaux is shown, which is the voltage across the secondary winding of transformer T1B. The waveforms depicted show the condition in which the state of flip-flop 32 is initially out of synchronization. Control signal st changes state between the two depicted flyback intervals and will not change state again unless synchronization is subsequently lost.

Figure 4:
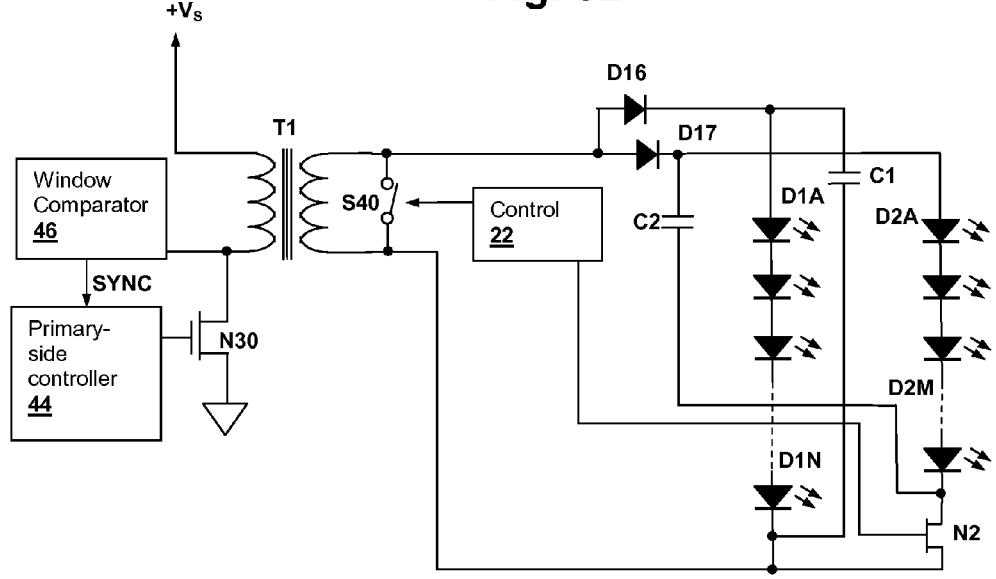
FIG. 4 is a simplified schematic diagram of a lighting circuit in accordance with another embodiment of the present invention.
Figure 7D:
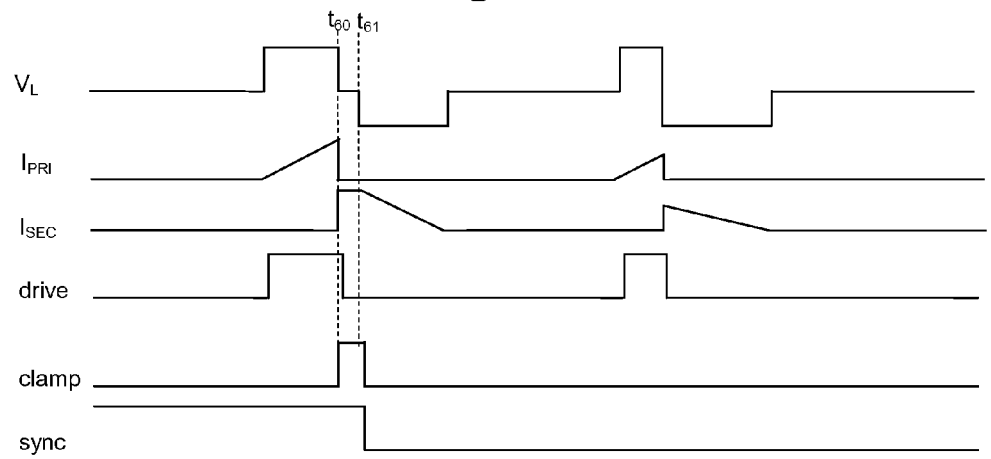

Referring now to FIG. 4, a lighting circuit in accordance with another embodiment of the present invention is shown. The circuit of FIG. 4 is similar to that of FIG. 2D and FIG. 3, except that synchronization in the circuit of FIG. 4 is provided by the secondary-side circuit by activation of switch S40 by control circuit 22 momentarily during the beginning of a flyback interval to indicate the state of a circuit within control circuit 22 (such as a flip-flop connected in the manner of flip-flop 32 of FIG. 3) that controls the state of the gate of transistor N2 to alternate charging between the LED strings formed by LEDs D1A-D1N and LEDs D2A-D2M. A window comparator 46 provides an indication of the voltage across the primary winding of transformer T1, which will be zero while switch S40 is closed. By detecting a pulse during the time period while switch S40 is closed, a synchronization signal SYNC can be derived and used to synchronize primary-side controller 44. Waveforms within the circuit of FIG. 4 are depicted in FIG. 7D, which shows the activation of signal clamp to activate switch S40 at time $t_{60}$, and the subsequent deactivation of switch S40 at time $t_{61}$ which then causes the zero-voltage portion of waveform $V_L$ from time $t_{60}$ to time $t_{61}$, and which is detected to generate synchronization signal sync.

Figure 5:
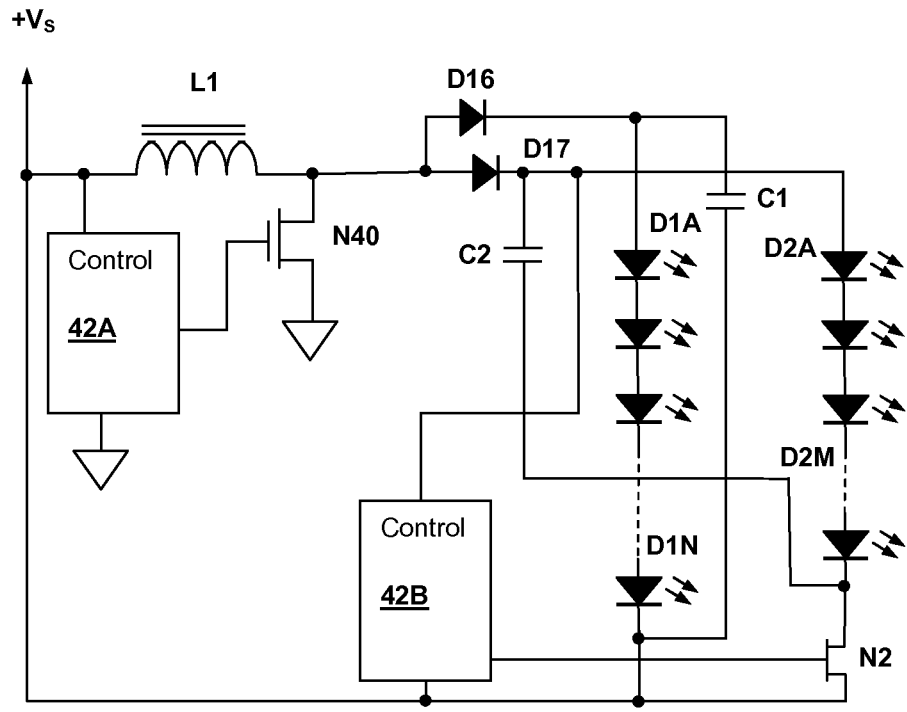
FIG. 5 is a simplified schematic diagram of a lighting circuit in accordance with another embodiment of the present invention.

Referring now to FIG. 5, a lighting circuit in accordance with another embodiment of the present invention is shown. The circuit of FIG. 5 is similar to those described above, except that instead of a flyback converter topology using a transformer, the circuit of FIG. 5 uses a boost-buck converter topology with an inductor L1 serving as the magnetic storage element. During the charging phase, a switching transistor N40 is activated to store current in inductor L1 by a control circuit 42A that is operated from the input power supply voltage $+V_S$. After inductor L1 is charged to the appropriate amount, control circuit 42A deactivates transistor N40, causing a boost flyback conduction through one of diodes D16 or D17, depending on whether or not transistor N2 is activated by another control circuit 42B, which controls the gate of transistor N2 in a manner similar to that described above with respect to the circuit of FIG. 2D, but is operated from the boosted power supply voltage across capacitor C2. Synchronization between control circuit 42A and control circuit 42B may be made by any of the techniques disclosed above, or, since there is no transformer isolation between the input and output circuits, control circuits 42A and 42B may be coupled in a non-isolated manner, such as by a coupling capacitor.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A circuit comprising:
   at least one output terminal for providing a first output current to a first string of light-emitting diodes and a second output current to a second string of light-emitting diodes; and
   a power switching circuit having a magnetic storage element from which energy is alternatively supplied, from a single winding of the magnetic storage element, to the first string of light-emitting diodes during a first period and to the second string of light-emitting diodes during a second period not substantially overlapping the first period, whereby different current or voltages may be applied to the first output terminal and the second output terminal to control the relative intensity of light provided by the first string of light-emitting diodes and the second string of light-emitting diodes, wherein a first electrical path supplies current to the first string of light-emitting diodes, wherein all switching devices included in the first electrical path are passive switches provided by diodes, and wherein the power switching circuit includes an active switching element responsive to a control signal for controlling whether or not current is supplied to the second string of light-emitting diodes.

2. The circuit of claim 1, wherein the power switching circuit comprises:
   a first switching circuit coupled to an input power source wherein the magnetic storage element is coupled to the first switching circuit and having at least one winding, wherein the first switching circuit charges the magnetic storage element from the input power source during charging intervals; and
   a second switching circuit coupled to the magnetic storage element for providing, from a same winding of the magnetic storage element, the first output current to the first string of light-emitting diodes during the first period to the first and the second output current to the second string of light-emitting diodes during the second period, and wherein the first and second period are alternating flyback intervals following the charging intervals.

3. The circuit of claim 2, wherein the magnetic storage element is a transformer having a primary winding coupled to the first switching circuit, wherein the first switching circuit charges the primary winding during charging intervals, and having a secondary winding coupled to the second switching circuit.

4. The circuit of claim 2, further comprising a first control circuit for controlling the first switching circuit, wherein the first control circuit controls the first switching circuit to control charging of the magnetic storage element to different energy storage levels during alternating ones of the charging intervals corresponding to the alternating flyback intervals, whereby different amounts of energy are transferred to the individual lighting devices.

5. The circuit of claim 4, further comprising a second control circuit for controlling the second switching circuit, and wherein the second switching circuit has an input coupled to an output of the first switching circuit for synchronizing the alternating charging intervals and the alternating flyback intervals.

6. The circuit of claim 4, wherein the first control circuit receives multiple dimming values corresponding to different levels of intensity of the first one of the lighting devices and the second one of the lighting devices, and wherein the first control circuit sets the different energy storage levels according to corresponding ones of the multiple dimming values.

7. The circuit of claim 2, wherein the at least one output terminal comprises at least three output terminals for providing at least one additional output current to at least one additional string of light-emitting diodes, and wherein the second switching circuit alternatively provides the first output current to the first string of light-emitting diodes, the second output current to the second string of light-emitting diodes and the at least one output current to the at least one additional string of light-emitting diodes, in sequence, during the alternating flyback intervals.

8. The circuit of claim 2, wherein the corresponding total forward bias voltages of the two or more light-emitting diode circuits have different values, and wherein the second switching circuit comprises a switching device coupling the first terminal to the second terminal, wherein the magnetic storage element is statically coupled to a first one of the at least one output terminal, wherein the first lighting element has a higher total forward bias voltage value than a lower total forward bias voltage value of the second lighting element, whereby when the switching device is disabled the first output current is conducted through the first lighting element, but when the switching device is enabled, the second output current is conducted through the second lighting element.

9. The circuit of claim 8, wherein the magnetic storage element is a transformer, wherein the two or more light-emitting diode circuits are coupled to a secondary winding of the transformer, and further comprising a first control circuit for controlling the first switching circuit, wherein the first control circuit controls the first switching circuit to control charging of a primary winding of the transformer to different volt-second product values during alternating ones of the charging intervals corresponding to the alternating flyback intervals, whereby the first output current differs from the second output current and wherein the first control circuit comprises a voltage sensing circuit for sensing differing reflected voltages across the primary winding of the transformer during the alternating flyback intervals and determining whether the alternating flyback intervals are following the correct corresponding charging intervals, and changing the order of the charging intervals according to a result of the determining.

10. The circuit of claim 1, wherein the magnetic storage element is a transformer, wherein the two or more light-emitting diode circuits are coupled to a secondary winding of the transformer, wherein the corresponding total forward bias voltages of the two or more light-emitting diode circuits have different values, wherein the first lighting element has a higher total forward bias voltage value than a lower total forward bias voltage value of the second lighting element, and further comprising a first control circuit for controlling the first switching circuit, wherein the first control circuit controls the first switching circuit to control charging of the primary winding of the transformer to different volt-second product values during alternating ones of the charging intervals corresponding to the alternating flyback intervals, whereby the first output current differs from the second output current and wherein the first control circuit comprises a voltage sensing circuit for sensing differing reflected voltages across the primary winding of the transformer during the alternating flyback intervals and determining whether the alternating flyback intervals are following the correct corresponding charging intervals, and changing the order of the charging intervals according to a result of the determining.

11. The circuit of claim 1, wherein the magnetic storage element is a transformer, wherein the two or more light-emitting diode circuits are coupled to a secondary winding of the transformer, wherein the corresponding total forward bias voltages of the two or more light-emitting diode circuits have different values, wherein the first lighting element has a higher total forward bias voltage value than a lower total forward bias voltage value of the second lighting element, and further comprising a first control circuit for controlling the first switching circuit, wherein the first control circuit controls the first switching circuit to control charging of the primary winding of the transformer to different volt-second product values during alternating ones of the charging intervals corresponding to the alternating flyback intervals, whereby the first output current differs from the second output current and wherein the first control circuit comprises a circuit for sensing differing durations of the alternating flyback intervals and determining whether the alternating flyback intervals are following the correct corresponding charging intervals, and changing the order of the charging intervals according to a result of the determining.

12. The circuit of claim 1, further comprising a dimming control circuit that controls charging of the magnetic storage element during a third period preceding the first period and during a fourth period preceding the second period, whereby the energy supplied to a first one of the at least one output terminal during the first period and the energy supplied to a second one of the at least one output terminal during the second period are controlled in conformity with a dimming control input provided to the dimming control circuit.

13. The circuit of claim 12, wherein a first total forward bias voltage of the first string of light-emitting diodes is greater than a second total forward bias voltage of the second string of light-emitting diodes plus an active voltage drop of the active switching element, whereby current is not supplied to the first string of light emitting diodes when the active switching element is activated.

14. The circuit of claim 1, wherein the power switching circuit includes a second electrical path for supplying current to the second string of light-emitting diodes coupled in parallel to the at least one output terminal with the first electrical path, wherein the second electrical path includes the active switching element coupled in series with the second string of light-emitting diodes, so that when the active switching element is activated by the control signal, current supplied to the parallel combination of the first electrical path and the second electrical path is permitted to flow through the second electrical path.

15. The circuit of claim 1, wherein the first string of light-emitting diodes and the second string of light-emitting diodes are connected in series to form the first electrical path, and wherein the active switching element is coupled in parallel with the second sting of light-emitting diodes, so that when the active switching element is activated by the control signal, current supplied to the first electrical path from the at least one output terminal is shunted through the active switching element, bypassing the second string of light-emitting diodes.

16. A method of supplying power to multiple lighting devices, comprising:
first controlling charging of a magnetic storage element during charging intervals;
second controlling discharging of the magnetic storage element to alternate application of energy stored in the magnetic storage element between the multiple lighting devices during alternating flyback intervals following the charging intervals, from a single winding of the magnetic storage element;
first providing a first output current or voltage to a first one of the lighting devices during a first one of the flyback intervals through a first electrical path in which all switching devices are passive switches provided by; and
second providing a second output current or voltage to a second one of the lighting devices during a second one of the flyback intervals through a second electrical path that includes an active switching element responsive to a control signal.

17. The method of claim 16, further comprising controlling the first switching circuit to control charging of the magnetic storage element to different energy storage levels during alternating ones of the charging intervals corresponding to the alternating flyback intervals, whereby different amounts of energy are transferred to the individual lighting devices.

18. The method of claim 17, further comprising synchronizing the first and second controlling.

19. The method of claim 17, further comprising receiving multiple dimming values corresponding to different levels of intensity of the first one of the lighting devices and the second one of the lighting devices, and wherein the first controlling sets the different energy storage levels according to corresponding ones of the multiple dimming values.

20. The method of claim 16, providing at least one additional output current or voltage to at least one additional corresponding one of the lighting devices, and wherein the second controlling alternatively directs energy from the magnetic storage element to supply the first output current or voltage, the second output current or voltage, and the at least one additional current or voltage during the alternating flyback intervals.

21. The method of claim 16, wherein the two or more lighting devices are two or more light-emitting diode circuits each having one or more light-emitting diodes connected in series, and wherein the first and second providing provide the first output current or voltage and the second output current or voltage to corresponding ones of the light-emitting diode circuits.

22. The method of claim 21, wherein the corresponding total forward bias voltages of the two or more light-emitting diode circuits have different values, and wherein the second controlling comprises controlling a switching device coupling the first lighting device to the second lighting device, wherein the secondary winding of the transformer is statically coupled to the first lighting device, wherein the first lighting device has a higher total forward bias voltage value than a lower total forward bias voltage value of the second lighting device, whereby when the switching device is disabled the first output current is conducted through the first lighting device, but when the switching device is enabled, the second output current is conducted through the second lighting device.

23. The method of claim 22, wherein the magnetic storage element is a transformer having a primary winding and a secondary winding, wherein the first controlling controls charging of the primary winding of the transformer to different volt-second product values during alternating ones of the charging intervals corresponding to the alternating flyback intervals, whereby the first output current differs from the second output current, and wherein the method further comprises:
sensing differing reflected voltages across the primary winding of the transformer during the alternating flyback intervals; and
determining whether the alternating flyback intervals are following the correct corresponding charging intervals, and changing the order of the charging intervals according to a result of the determining.

24. The method of claim 21, wherein the magnetic storage element is a transformer having a primary winding and a secondary winding, wherein the corresponding total forward bias voltages of the two or more light-emitting diode circuits have different values, wherein the first lighting element has a higher total forward bias voltage value than a lower total forward bias voltage value of the second lighting element, wherein the first controlling controls the first switching circuit to charge the primary winding of the transformer to different volt-second product values during alternating ones of the charging intervals corresponding to the alternating flyback intervals, whereby the first output current differs from the second output current, and wherein the method further comprises:

sensing differing reflected voltages across the primary winding of the transformer during the alternating flyback intervals; and determining whether the alternating flyback intervals are following the correct corresponding charging intervals, and changing the order of the charging intervals according to a result of the determining.

25. The method of claim 21, wherein the magnetic storage element is a transformer having a primary winding and a secondary winding, wherein the corresponding total forward bias voltages of the two or more light-emitting diode circuits have different values, wherein the first lighting element has a higher total forward bias voltage value than a lower total forward bias voltage value of the second lighting element, wherein the first controlling controls the first switching circuit to charge the primary winding of the transformer to different volt-second product values during alternating ones of the charging intervals corresponding to the alternating flyback intervals, whereby the first output current differs from the second output current, and wherein the method further comprises:

detecting differing durations of the alternating flyback intervals; and determining whether the alternating flyback intervals are following the correct corresponding charging intervals, and changing the order of the charging intervals according to a result of the determining.

26. A circuit for powering two or more lighting devices, the circuit comprising:

a first output terminal for providing a first output current or voltage to a first one of the lighting devices;

a second output terminal for providing a second output current or voltage to a second one of the lighting devices;

a first switching circuit coupled to an input power source;

a transformer coupled to the first switching circuit and having a primary winding and a secondary winding, wherein the first switching circuit charges the transformer from the input power source during charging intervals; and a second switching circuit coupled to the transformer for providing the first output current or voltage to the first output terminal and the second output current or voltage to the second output terminal during alternating flyback intervals following the charging intervals, wherein the second switching circuit is controlled by information provided at the primary winding of the transformer and detected at the secondary winding of the transformer.

27. The circuit of claim 26, further comprising a first control circuit for controlling the first switching circuit, wherein the first control circuit controls the first switching circuit to control charging of the primary winding of the transformer to different energy storage levels during alternating ones of the charging intervals corresponding to the alternating flyback intervals, whereby different amounts of energy are transferred to the individual lighting devices.

28. A method of supplying power to multiple lighting devices, comprising:

first controlling charging of a primary winding of a transformer during charging intervals;

second controlling discharging of energy stored in the transformer through a secondary winding of the transformer to alternate application of energy stored in the transformer between the multiple lighting devices during alternating flyback intervals following the charging intervals, according to information provided at the primary winding of the transformer and detected at the secondary winding of the transformer;

first providing a first output current or voltage to a first one of the lighting devices during a first one of the flyback intervals; and second providing a second output current or voltage to a second one of the lighting devices during a second one of the flyback intervals.

29. The method of claim 28, further comprising controlling the first switching circuit to control charging of the magnetic storage element to different energy storage levels during alternating ones of the charging intervals corresponding to the alternating flyback intervals, whereby different amounts of energy are transferred to the individual lighting devices.

\* \* \* \* \*